(12) United States Patent
Gratz

(10) Patent No.: US 6,453,613 B1
(45) Date of Patent: Sep. 24, 2002

(54) TRAY FOR USE IN THE TRANSPORT AND THE DISPLAY OF A PLURALITY OF FLOWER POTS

(75) Inventor: Jeffrey J. Gratz, Hartland, WI (US)

(73) Assignee: Fibreform Containers, Inc., Germantown, WI (US)

( * ) Notice: Subject to any disclaimer, the term of this patent is extended or adjusted under 35 U.S.C. 154(b) by 0 days.

(21) Appl. No.: 09/760,273

(22) Filed: Jan. 12, 2001

(51) Int. Cl.[7] ................................................ A01G 9/02
(52) U.S. Cl. ................................................ 47/84; 47/86
(58) Field of Search ..................... 47/44, 65, 66.5, 47/84, 85, 86

(56) References Cited

U.S. PATENT DOCUMENTS

| | | | |
|---|---|---|---|
| 1,904,072 A | 4/1933 | Nelson et al. | |
| D185,652 S | 7/1959 | Williams | |
| 3,028,005 A | 4/1962 | Shaffer | |
| 3,056,232 A | 10/1962 | Chaplin | |
| 3,142,133 A | * 7/1964 | Brooks | 47/86 |
| 3,284,949 A | * 11/1966 | Park | 47/84 |
| 3,651,976 A | * 3/1972 | Chadbourne | 47/86 |
| 3,660,934 A | 5/1972 | Pollack et al. | |
| 3,810,329 A | 5/1974 | Lecuru et al. | |
| 3,905,506 A | 9/1975 | Florian | |
| 4,170,301 A | 10/1979 | Jones et al. | |
| 4,684,013 A | 8/1987 | Jacobs | |
| 4,793,097 A | * 12/1988 | Whitcomb | 47/86 |
| 4,802,588 A | 2/1989 | Silvola | |
| 4,887,388 A | * 12/1989 | Waltel, Jr. | 47/85 |
| 4,962,855 A | 10/1990 | Holmquist | |
| 5,022,183 A | 6/1991 | Bohlmann | |
| 5,094,060 A | 3/1992 | Caird | |
| 5,161,710 A | 11/1992 | Chumley | |
| 5,345,712 A | 9/1994 | Lambert | |
| 5,427,240 A | 6/1995 | Holtkamp, Jr. | |
| 5,481,825 A | 1/1996 | Aoyama | |
| 5,664,370 A | * 9/1997 | Boudreau et al. | 47/86 |
| 5,816,402 A | 10/1998 | Weder et al. | |
| 5,819,941 A | 10/1998 | Vanwingerden | |

* cited by examiner

Primary Examiner—Charles T. Jordan
Assistant Examiner—Elizabeth Shaw
(74) Attorney, Agent, or Firm—Boyle Fredrickson Newholm Stein & Gratz S.C.

(57) ABSTRACT

A tray is provided for holding a plurality of flower pots during transport and display. The tray includes a supporting structure having an outer periphery and a plurality of pot receiving cavities formed therein. The pot receiving cavities are provided for receiving corresponding flower pots. An edge member extends about and is interconnected to the outer periphery of the support structure for discouraging the flexing of the support structure during transport of the tray.

17 Claims, 1 Drawing Sheet

TRAY FOR USE IN THE TRANSPORT AND THE DISPLAY OF A PLURALITY OF FLOWER POTS

FIELD OF THE INVENTION

The present invention relates generally to trays, and in particular, to a tray for use in transporting and displaying a plurality of flower pots.

BACKGROUND AND SUMMARY OF THE INVENTION

It is often difficult and expensive to transport bulk items such as plants housed within corresponding flower pots. Due to the delicate nature of the plants being transported, great care must be taken to prevent damage thereto. Consequently, the plants are often transported by semi-trailers equipped with a plurality of specially designed shelves which prevent the flower pots from tipping during transport. It has been found that the process for loading the flower pots onto and removing the flower pots from a semi-trailer is both time consuming and expensive.

In order to facilitate the loading of flower pots onto and the unloading of flower pots from a semi-trailer, plastic trays have been developed which allow for multiple flower pots to be simultaneously carried. However, while reducing the labor costs associated with individually loading the flower pots onto and unloading the flower pots from a semi-trailer, such molded plastic trays are relatively expensive to manufacture. As such, it is highly desirable to provide an inexpensive tray for simultaneously carrying multiple flower pots.

Therefore, it is a primary object and feature of the present invention to provide a tray for use in transporting and displaying a plurality of flower pots.

It is a further object and feature of the present invention to provide a tray for use in transporting and displaying a plurality of flower pots which is simple and inexpensive to manufacture.

It is a still further object and feature of the present invention to provide a tray for use in transporting and displaying a plurality of flower pots which may be reused by an end user.

In accordance with the present invention, a tray is provided for holding a flower pot during shipment and display. The tray includes a generally flat support wall having an outer periphery. A pot holding structure depends from the support wall. The pot holding structure defines a pot receiving depression for receiving the flower pot therein. An edge member extends about and is interconnected to the outer periphery of the support wall for discouraging the flexing of the support member during shipment of the display.

The pot holding structure includes a generally conical wall having a first end generally co-planar with the support wall and the second closed end. The conical wall defines the pot receiving depression in the tray. The pot holding structure intersects the support wall at an upper edge. The upper edge defines an opening which is in communication with the pot receiving depression. The support wall includes a plurality of spaced finger depressions therein about the upper edge of the pot holding structure to facilitate removal of the flower pot received in the pot receiving depression. It is contemplated that the conical wall be flexible so as to accommodate flower pots of different dimensions within the pot receiving depression. The closed end of the conical wall includes a generally flat supporting surface parallel to the support wall. The flower pot is engageable to the supporting surface when the flower pot is received in the pot receiving depression.

In accordance with a still further aspect of the present invention, a tray is provided for holding a plurality of flower pots during shipment and display. The tray includes a support structure having an outer periphery. The support structure includes a plurality of pot receiving depressions formed therein. The pot receiving depressions are sized for receiving corresponding flower pots therein. An edge member extends about and is interconnected to the outer periphery of the support structure for discouraging the flexing of the support structure during shipment of the tray.

It is contemplated that each pot receiving depression be defined by a generally conical wall depending from the support structure. Each conical wall has a first end generally co-planer with and connected to the support structure and a second opposite end. The first ends of the conical walls define openings in the support structure which are in communication with corresponding pot receiving depressions. The support structure includes a plurality of spaced finger depressions about corresponding openings to facilitate removal of flower pots received in the flower pot receiving depressions. The conical walls are flexible so as to accommodate flower pots of different dimensions within the pot receiving depressions. Generally flat supporting surfaces are interconnected to corresponding second ends of the conical walls. The generally flat supporting surfaces are generally parallel to the support structure.

The edge member of the tray includes a first sidewall depending from the outer periphery of the support structure and a second sidewall extending laterally from the first support structure. The support structure may include at least one finger receipt aperture therethrough to facilitate the grasping of the tray by a user. The support structure and the edge member may be molded from a sheet of material having a generally uniform thickness.

In accordance with a still further aspect of the present invention, a tray is provided for transporting and storing a plurality of flower pots. The tray includes a sheet having first and second sides and an outer periphery. The sheet includes a plurality of openings therein. A plurality of pot receiving structures depend from the second side of the sheet. Each pot receiving structure is aligned with a corresponding opening in the sheet and defines a cavity for receiving a flower pot therein. An edge member extends about the outer periphery of the sheet. The edge member includes a first sidewall depending from the outer periphery of the sheet and the second sidewall extending laterally from the first sidewall.

It is contemplated that the sheet include at least one finger receipt aperture therethrough to facilitate the grasping of the tray by a user. Each pot receiving structure includes a generally conical wall depending from the second side of the sheet. The conical wall has a first end adjacent the second side of the sheet and a second closed end. The sheet also includes a plurality of spaced finger depressions therein about corresponding openings to facilitate removal of flower pots received in the cavities.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings.

DETAILED DESCRIPTION OF THE DRAWINGS

Figure 1:
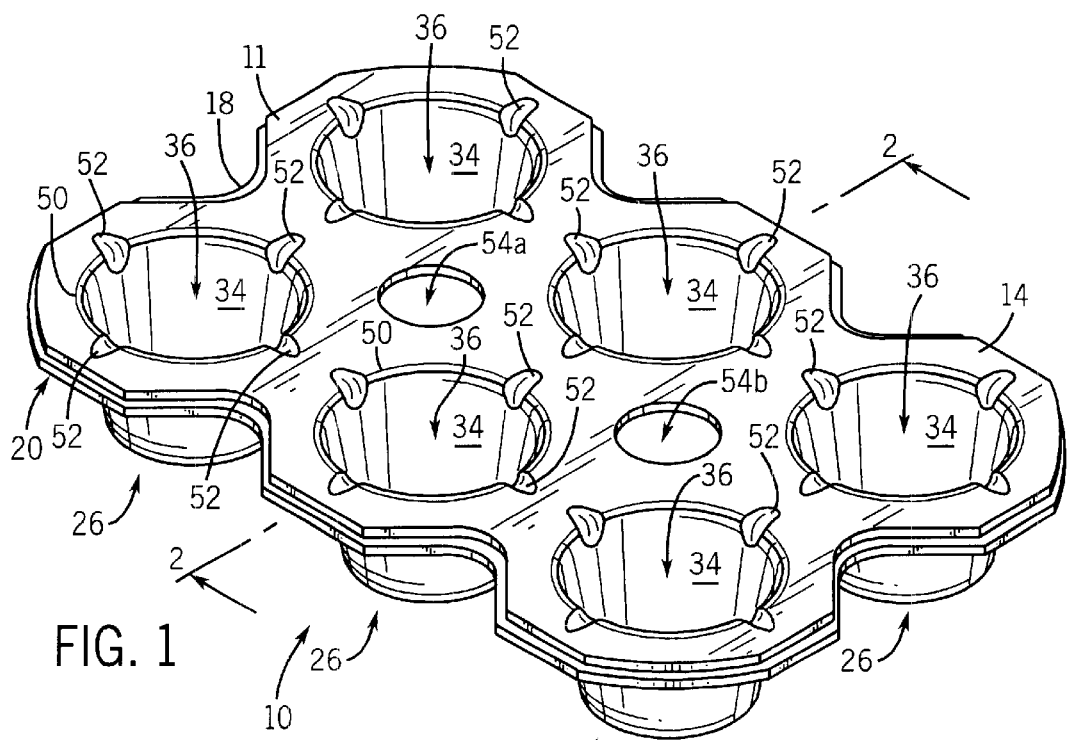
FIG. 1 is an isometric view of a tray in accordance with the present invention.

Referring to FIG. 1, a tray in accordance with the present invention is generally designated by the reference numeral 10. As hereinafter described, it is intended that tray 10 be used for transporting and displaying a plurality of flower pots 12a and 12b, FIG. 2. However, it is contemplated that tray 10 be used for transporting and displaying other types of generally cylindrical structures without deviating from the scope of the present invention.

Figure 2:
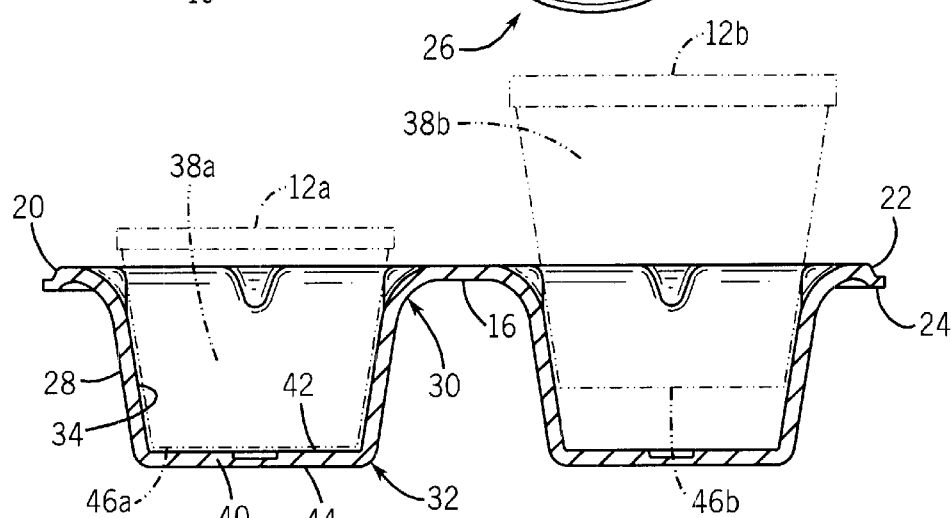
FIG. 2 is a cross-sectional view of the tray of the present invention taken along line 2—2 of FIG. 1.

Tray 10 includes a generally flat support structure 11 having a first upper surface 14 and a second lower surface 16. Support structure 11 further includes an outer periphery 18 having an edge member 20 interconnected therethrough. As best seen in FIG. 2, edge member 20 includes a first sidewall 22 which depends from outer periphery 18 of support structure 11 and a second sidewall 24 which projects laterally from first sidewall 22. Edge member 20 adds strength and stability to support structure 11 to prevent flexing of tray 10 when used to carry a plurality of flower pots 12a and 12b.

Tray 10 further includes a plurality of pot receiving structures 26. Each pot receiving structure 26 includes a generally conical wall 28 having a first end 30 integral with and depending from support structure 11 and a second opposite end 32. Conical walls 28 of pot receiving structures 26 define corresponding pot receiving cavities 36 in tray 10. Pot receiving cavities 36 have predetermined dimensions so as to allow the base portions 38a and 38b of flower pots 12a and 12b, respectively, to be snugly retained therein. It is contemplated that conical wall 28 be formed from a flexible material so as to allow pot receiving cavities 36 to accommodate slight variations in the dimensions of the base portions 38a and 38b of flower pots 12a and 12b, respectively.

Pot receiving structures 26 further include supporting walls 40 which close the second ends 32 of conical walls 28. Each supporting wall 40 includes an upwardly directed surface 42 directed towards the interior of a corresponding pot receiving cavity 36 in pot receiving structure 26 and a downwardly directed surface 44. During transport, downwardly directed surface 44 engages and supports tray 10 on a supporting surface such as a shelve, floor or the like. Upwardly directed surfaces 42 of supporting walls 40 are adapted to be engaged by the bottom surfaces 46a and 46b of flower pots 12a and 12b, respectively, in order to support such flower pots.

Support structure 11 further includes a plurality of openings therein which communicate with corresponding pot receiving cavities 36 and pot receiving structures 26. Each opening is defined by a corresponding edge 50 in support structure 11. Edges 50 include a plurality of circumferentially spaced depressions 52 therein which facilitate the insertion and the removal of flower pots 12a and 12b from corresponding pot receiving cavities 36.

Support structure 11 further includes first and second finger receipt apertures 54a and 54b, respectively therethrough which extends between upper surface 14 and lower surface 16 of support structure 11. It can be appreciated that finger receipt apertures 54a and 54b facilitate the grasping of tray 10 by a user.

In the depicted embodiment, tray 10 includes six pot receiving cavities 36 for receiving a corresponding number of flower pots therein. However, it is contemplated that as being within the scope of the present invention to provide tray with a greater or fewer number of pot receiving cavities 36 therein. In addition, tray 10 is shown being of a generally rectangular shape. Alternatively, other configurations are possible without deviating from the scope of the present invention.

Figure 3:
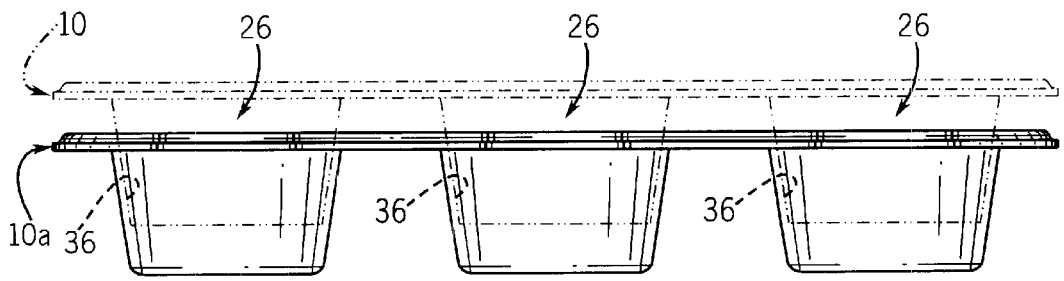
FIG. 3 is a side elevational view showing a plurality of trays in accordance with the present invention in a nested relationship.

Referring to FIG. 3, when not in use, it is contemplated that trays 10 and 10a be nestable upon each other. In such configuration, the pot receiving structures 26 of tray 10 are received within corresponding pot receiving cavities 36 in tray 10a. With trays 10 and 10a nested upon each other, the necessary spaced needed to transport trays 10 and 10a to an end user is minimized.

In use, tray 10 is positioned on a supporting surface such that the downwardly directed surfaces 44 of supporting wall 40 of pot receiving structures 26 engage a supporting surface. Flower pots 12a and 12b are inserted into pot receiving cavities 36 in tray 10 until bottom surfaces 46a and 46b of flower pots 12a and 12b, respectively, engage corresponding upwardly directed surfaces 42 of supporting walls 40 of pot receiving structures 26. Upon insertion of flower pots 12a and 12b, into corresponding pot receiving cavities 36, a user grasps tray 10 either on the outer periphery 18 of support structure 11 or through finger receipt apertures 54a and 54b and carries tray 10 to a desired location. Edge member 20 provides sufficient strength and stability such that support structure 11 maintains its configuration.

In a preferred embodiment, it is contemplated that tray 10 be molded from molded pulp or other suitable material such as expanded polystyrene or the like as a single integral unit. As best seen in FIG. 2, it is contemplated that tray 10 have a uniform thickness.

Various modes of carrying out the invention are contemplated as being within the scope of the following claims particularly pointing out and distinctly claiming the subject matter which is regarded as the invention.

I claim:

1. A tray for holding a flower pot during shipment and display, comprising:

a generally flat support wall having upper and lower surfaces, first and second apertures therethrough and an outer periphery, the outer periphery having a plurality of indentations therein;

a pot holding structure depending from the lower surface of the support wall, the pot holding structure defining a pot receiving depression for receiving the corresponding flower pot therein; and an edge member extending about and interconnected to the outer periphery of the support wall for discouraging the flexing of the support member during shipment of the tray.

2. The tray of claim 1 wherein the pot holding structure includes a generally conical wall having a first end generally co-planer with the support wall and second closed end, the conical wall defining the pot receiving depression.

3. The tray of claim 2 wherein the conical wall is flexible so as to accommodate flower pots of different dimensions within the pot receiving depression.

4. The tray of claim 2 wherein the closed end of the conical wall includes a generally flat supporting surface parallel to the support wall, the flower pot engageable with the supporting surface when the flower pot is received in the pot receiving depression.

5. The tray of claim 1 wherein the pot holding structure intersects the support wall at an upper edge, the upper edge defining an opening in communication with the corresponding pot receiving depression.

6. The tray of claim 5 wherein the support wall includes a plurality of spaced finger depressions therein about the upper edge of the pot holding structure to facilitate the removal of the flower pot received in the pot receiving depression.

7. A tray for holding a plurality of flower pots for shipment and display, comprising:

a flat support structure having first and second apertures therethrough and an outer periphery with a plurality of indentations therein, and including a plurality of pot receiving depressions formed therein, the pot receiving depressions receiving corresponding flower pots therein; and an edge member extending about and interconnected to the outer periphery of the support structure for discouraging the flexing of the support structure during shipment of the tray.

8. The tray of claim 7 wherein each pot receiving depression is defined by a generally conical wall depending from the support structure, the conical wall having a first end generally co-planer with and interconnected to the support structure and a second opposite end.

9. The tray of claim 8 wherein the first ends of the conical walls define openings in the support structure in communication with corresponding pot receiving depressions.

10. The tray of claim 9 wherein the support structure includes a plurality of spaced finger depressions about corresponding openings to facilitate removal of flower pots received in the pot receiving depressions.

11. The tray of claim 8 wherein the conical walls are flexible so as to accommodate flower pots of different dimensions within the pot receiving depressions.

12. The tray of claim 8 further comprising generally flat supporting surfaces interconnected to corresponding second ends of the conical walls, the generally flat supporting surfaces being generally parallel to the support structure.

13. The tray of claim 7 wherein the edge member includes a first sidewall depending from the outer periphery of the support structure and a second sidewall extending laterally from the first sidewall.

14. A tray for transporting and storing a plurality of flower pots, comprising:

a flat sheet having first and second holes therethrough, first and second sides and an outer periphery with a plurality of indentations therein, the sheet including a plurality of openings therein;

a plurality of pot receiving structures depending from the second side of the sheet, each pot receiving structure being aligned with a corresponding opening in the sheet and defining a cavity for receiving a flower pot therein; and an edge member extending about the outer periphery of the sheet, the edge member including a first sidewall depending from the outer periphery of the sheet and a second sidewall extending laterally from the first sidewall.

15. A tray for transporting and storing a plurality of flower pots, comprising:

a sheet having first and second sides and an outer periphery, the sheet including a plurality of openings therein;

a plurality of pot receiving structures depending from the second side of the sheet, each pot receiving structure being aligned with a corresponding opening in the sheet and defining a cavity for receiving a flower pot therein; and an edge member extending about the outer periphery of the sheet, the edge member including a first sidewall depending from the outer periphery of the sheet and a second sidewall extending laterally from the first sidewall.

16. The tray of claim 15 wherein each pot receiving structure includes a generally conical wall depending from the second side of the sheet, the conical wall having a first end adjacent the second side of the sheet and a second closed end.

17. The tray of claim 15 wherein the sheet includes plurality of spaced finger depressions therein about corresponding openings to facilitate removal of flower pots received in the cavities.

* * * * *